United States Patent [19]

Cole et al.

[11] Patent Number: 4,893,878
[45] Date of Patent: Jan. 16, 1990

[54] INLINE PROPORTIONING VALVE FOR BRAKE SYSTEMS

[75] Inventors: Joe S. Cole, Mesquite; Jack D. Hutcheson, Garland, both of Tex.

[73] Assignee: Hilite Industries, Inc., Carrollton, Tex.

[21] Appl. No.: 249,682

[22] Filed: Sep. 27, 1988

[51] Int. Cl.⁴ ............................................. B60T 8/26
[52] U.S. Cl. ..................................... 303/9.75; 60/591; 188/349
[58] Field of Search ..................... 303/9.62, 9.75, 9.73, 303/9.74, 9.72, 9.71, 9.69, 9.64, 9.65, 84.1, 84.2, 59–60, 72; 188/349; 60/591

[56] References Cited

U.S. PATENT DOCUMENTS

| | | | |
|---|---|---|---|
| 3,245,221 | 4/1966 | James et al. | 303/9.73 X |
| 4,331,363 | 5/1982 | Berisch | 303/9.74 |
| 4,426,117 | 1/1984 | Burgdorf et al. | 303/9.73 |
| 4,475,339 | 10/1984 | Inoue | 60/591 |
| 4,477,122 | 10/1984 | Hayashida | 60/591 X |
| 4,664,451 | 5/1987 | Sakaguchi et al. | 303/9.75 |
| 4,668,020 | 5/1987 | Barr | 303/9.75 |
| 4,669,268 | 6/1987 | Takeuchi et al. | 303/9.75 X |
| 4,749,237 | 6/1988 | Kubota et al. | 60/591 X |
| 4,774,809 | 10/1988 | Hayashida et al. | 60/591 |

*Primary Examiner*—Douglas C. Butler
*Attorney, Agent, or Firm*—Fleit, Jacobson, Cohn, Price, Holman & Stern

[57] ABSTRACT

A valve for use in the brake system of an automobile vehicle and more specifically to a proportioning valve located between the master cylinder and the wheel cylinders in a hydraulic braking system. The valve is constructed with a one-piece housing screw threaded directly into a port on the master cylinder and provided with an outlet port at the opposite end of the housing. The exterior of the housing includes a groove receiving an O-ring which overlies a radially extending vent passageway communicating with the interior chamber within the housing. A spring biased piston is positioned in the chamber together with a removable insert and poppet associated with a passage through the piston with these components retained in place by retaining ring structures, springs and the like and sealed by O-ring seals. The construction of the housing and piston enables increased expansion volume which provides for an increased pressure drop downstream of the valve when the pressure is released upstream of the valve. The one-piece housing and insert enables the housing to be machined from the poppet end thereby providing ease of manufacture, greater accuracy, ease of assembly and reduction in costs of machining time and materials.

7 Claims, 1 Drawing Sheet

INLINE PROPORTIONING VALVE FOR BRAKE SYSTEMS

BACKGROUND OF THE INVENTION

Field of the Invention

The present invention generally relates to a valve for use in the brake system of an automotive vehicle and more specifically to a proportioning valve located between the master cylinder and the wheel cylinders in a hydraulic braking system. The valve is constructed with a one-piece housing screw threaded directly into a port on the master cylinder and provided with an outlet port at the opposite end of the housing. The exterior of the housing includes a groove receiving an O-ring which overlies a radially extending vent passageway communicating with the interior chamber within the housing. A spring biased piston is positioned in the chamber together with a removable insert and poppet associated with a passage through the piston with these components retained in place by retaining ring structures, springs and the like and sealed by O-ring seals. The construction of the housing and piston enables increased expansion volume which provides for an increased pressure drop downstream of the valve when the pressure is released upstream of the valve. The one-piece housing and insert enables the housing to be machined from the poppet end thereby providing ease of manufacture, greater accuracy, ease of assembly and reduction in costs of machining time and materials.

INFORMATION DISCLOSURE STATEMENT

Proportioning and control valves located in association with a master cylinder in a hydraulic braking system are generally well-known with U.S. Pat. No. 4,331,363 issued May 25, 1982 disclosing one such arrangement utilizing a spring biased piston arrangement which includes a two-piece housing that is screw threaded directly into a port on the master cylinder of the hydraulic braking system. However, the unique structure arrangement disclosed in this application is not found in this patent and not found in any prior art.

SUMMARY OF THE INVENTION

An object of the present invention is to provide an inline proportioning valve for use in a vehicle braking system utilizing a one-piece housing that can be machined from one end thereof to reduce machining and material costs together with an insert which guides a differential area piston and houses a poppet at one end thereof.

Another object of the invention is to provide an inline proportioning valve in accordance with the preceding object in which the one-piece housing is provided with a peripheral groove in communication with a vent extending radially from the peripheral groove to the internal chamber in the housing with the vent being closed by an O-ring received in the groove.

A further object of the invention is to provide a valve in accordance with the preceding objects in which the piston has an increased stroke and hence increased expansion volume to enable an increased pressure drop to exist downstream of the valve when the pressure is released upstream.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
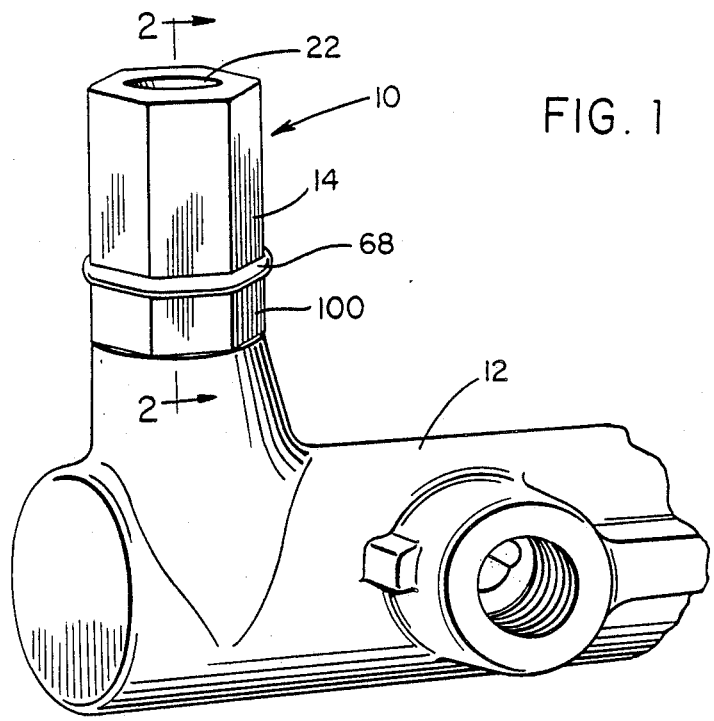
FIG. 1 is a fragmental, perspective view of a portion of a master cylinder illustrating the inline proportioning valve mounted thereon.

Referring now specifically to the drawings, the inline proportioning valve of the present invention is generally designated by reference numeral 10 and, in FIG. 1, is illustrated in an operative position in relation to and mounted on a master cylinder 12 which forms part of the hydraulic braking system of an automotive vehicle.

Figure 2:
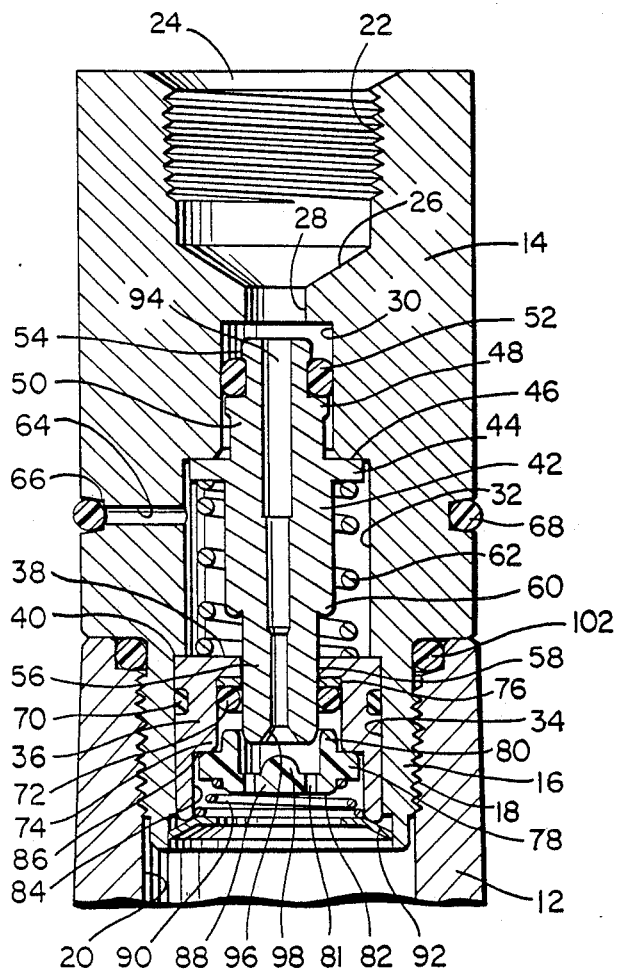
FIG. 2 is a longitudinal, sectional view taken substantially upon a plane passing along section line 2-2 on FIG. 1 illustrating the specific structural details of the inline proportioning valve.

The valve 10 includes a one-piece housing 14 which has one end 16 which is smaller in peripheral circumference and provided with external threads 18 for threaded engagement into an internally threaded bore 20 in the master cylinder 12 as illustrated in FIG. 2 for mounting the valve 10 directly from the master cylinder. The other end of the housing 14 includes an internally threaded outlet 22 which has a beveled or chamfered peripheral edge 24 and a beveled inner end 26 which extends to a central passageway 28 having a diameter substantially less than the internally threaded outlet 22. The outlet 22 is connected by a suitable threaded fitting to a hydraulic conduit or tube extending to a wheel cylinder (not shown) in a hydraulic brake system.

The housing 14 includes a cavity 30 extending longitudinally therein in communication with the passageway 28 with the cavity or chamber 30 having a diameter slightly greater than the passageway 28. Forming an enlarged continuation of the cavity or chamber 30 is a larger diameter cavity or chamber 32. At the inlet end of the housing, the cavity or chamber 32 is slightly enlarged as at 34 to receive a cylindrical insert 36 which includes an inner wall or face 38 that is limited in its inward movement by a shoulder 40 formed at the juncture between the cavity or chamber 32 and the larger cavity or chamber 34.

A differential area piston 42 is received in the cavities or chambers 30, 32 and 34 and includes a peripheral, outwardly extending flange 44 intermediate the ends of the piston for engagement with a shoulder 46 between the cavity or chamber 30 and the cavity or chamber 32. The upper end of the piston 42 includes a peripheral shoulder 48 which is slidably received in the chamber 30 and projects slightly outwardly from the circumference of the upper end portion 50 of the piston 42. An O-ring seal 52 is engaged with the upper surface of the flange 48 and is retained in place by outlet pressure. A peripheral flange or rib 54 on the upper end of the piston 42 retains the O-ring 52 on disassembly.

The piston 42 includes a lower end 56 of reduced diameter which is received in an opening 58 in the top wall 38 of the insert 36 with the juncture between the larger diameter portion of the piston 42 and the smaller diameter portion 56 defining a shoulder 60. A calibrated coil spring 62 is positioned within the cavity 32 and has its ends abuttingly engaging the flange 44 on piston 42 and the top wall 38 of the insert 36, respectively, to bias the flange 44 against the shoulder 46. The cavity or chamber 32 also includes a radially extending vent passage or hole 64 communicating with a peripheral groove 66 in the exterior of the housing 14 with an O-ring seal 68 being positioned in the groove 6 and forming a closure for the vent passage 64 with pressure in the vent passage 64 causing the O-ring seal 68 to move outwardly in the groove sufficiently to vent the pressure from the vent hole or passage 64. This structure eliminates the use of more complicated valve structures to enable pressure discharge from the vent passage 64 and prevent return flow of ambient air which may be contaminated with particulate material and the like.

The insert 36 is generally cylindrical in configuration and is sealed in relation to the interior of the cavity or chamber 34 by an O-ring seal 70. Also, an O-ring seal 72 is interposed between the exterior of the reduced diameter 56 of the piston 42 and the interior surface of the chamber or cavity 74 of the interior of the insert 36. A backup ring 76 is positioned against the surface of the top wall 38 of the insert 36 with the O-ring seal 72 engaged therewith. This plastic ring 76 of generally rigid construction prevents O-ring 72 from being extruded into the gap between the piston and insert. A poppet 78 is positioned and housed within the insert 36 and includes an inner rounded peripheral edge 80 engageable with the seal 72. The outer periphery 82 of the poppet is received within an enlarged cylindrical chamber or cavity 84 in the insert 36 with a shoulder 86 being provided at the juncture between the chamber 84 and the chamber 74 which form the interior of the insert 36. The bottom surface 88 of the poppet 78 includes openings or passageways 87 to allow flow therethrough and is disposed slightly below the periphery 82 with a conical spring 90 engaging the periphery of the bottom surface 88 of the poppet with the conical spring 90 also engaging a retaining ring 92 mounted interiorly of the chamber 34 in the reduced diameter end portion 16 of the housing 10 to retain the poppet 78, the insert 36 and piston 42 and related components assembled with respect to the housing 14. This facilitates assembly of the valve and also enables the housing to be machined from the poppet end thereof to reduce machining costs and the cost of material.

The piston 42 includes a longitudinally extending passageway or bore 94 extending therethrough which decreases in diameter in steps from the upper end to the lower end with the lower end of the piston including a conical seat 96 communicating with the smallest diameter portion of the bore 94. The poppet 78 includes a semispherical projection forming a valve member 98 which will engage with the conical seat or recess 96 when the piston 42 and poppet 78 are moved towards each other.

The housing 14 is constructed from hexagonal bar stock and includes a polygonal exterior 100 to enable association of a wrench therewith to enable assembly and disassembly. Also, an O-ring seal 102 is positioned between the housing 14 and the boss on the master cylinder 12 for sealing the valve to the master cylinder.

During operation, the proportioning valve will be oriented in the position illustrated in FIG. 2 so that fluid flow proceeds past the poppet 78 into the passageway 94 to the rear brake cylinders inasmuch as the valve member 98 on the poppet is not engaged with the valve seat 96 with the poppet 78 including peripheral passageways 87 enabling flow of fluid from the master cylinder into and through the passageway 94 to a conduit extending oo the rear brake cylinders. As pressure increases in the brake system as the brake pedal is pushed downwardly, the increase in pressure in chamber 30 will react against the end of the piston 42 remote from the valve seat 96 and overcome the calibrated bias of spring 62. Due to the differential in area between the upper end of the piston 42 and the lower end thereof which is engaged by the fluid pressure from the master cylinder, the piston 42 will move downwardly towards the poppet 78 until the valve member 98 on the poppet engages the valve seat 96 to regulate or close off the flow of hydraulic fluid through the passageway 94. The purpose of the vent passageway 64 and the O-ring 68 is to vent any pressure which may leak by the seal structures to atmosphere.

The proportioning valve operates in the same manner as existing proportioning valves with respect to a control piston moving in response to differential pressure contact areas at opposite ends of the piston. However, the one-piece housing structure vent passageway, groove and O-ring seal and the insert and poppet arrangement together with the retaining ring reduce material costs, reduce the time and costs of machining the housing since all the cavities are machined from the poppet end and the insert enables machining from one end and also guides the piston and forms a chamber or cavity receiving the O-ring for the lower end of the piston and receiving the poppet thereby not only facilitating the construction of the valve but also the assembly of the components since all of the components for the interior of the valve are inserted from the poppet end and retained in place by the insert and retaining ring.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An inline proportioning valve for the hydraulic brake system of a vehicle comprising a housing of one-piece construction with one end of the housing being connected with a master cylinder of the brake system and the other end of the housing being connected with a fluid flow line extending to vehicle wheel cylinders, said housing including an axial inlet port in the end thereof connected with the master cylinder and an outlet port in the end thereof connected to the fluid flow line, said housing including a plurality of axially extending chambers in communication with each other with each chamber being of cylindrical configuration and decreasing in diameter from the inlet port to the outlet port, said housing including three chambers with a peripheral, radially extending shoulder at the juncture between adjacent chambers, a differential area piston positioned in said chambers in sealed relation thereto, said piston including an axial passageway therethrough, said piston including a larger pressure contact area in the chamber adjacent the outlet port than the pressure contact area in the chamber adjacent the inlet port whereby pressure passing through the passageway in the piston will react against the piston to force the piston towards the inlet port due to the differential contact areas, calibrated spring means biasing the piston toward the outlet port to resist movement of the piston toward the inlet port, said chamber adjacent the inlet port including an insert engaging the shoulder at the inner end of the chamber adjacent the inlet port with the insert forming a closure for the chamber adjacent the inlet port and including a central opening guidingly receiving the piston with the diameter of the portion of the piston guided by the insert being smaller than the diameter of the piston received in the chamber adjacent the outlet port, a valve member mounted in the insert in normally open relation to the passageway through the piston to enable pressure flow through the piston, said valve member closing the passageway through the piston when the piston moves toward the inlet port to control and stop flow through the passageway when the differential piston is moved a predetermined distance toward the inlet port by compressing the calibrated spring means, said housing includes a radial vent passage communicating with the central chamber in the housing, a peripheral groove in the exterior of the housing communicated with the vent passage and an O-ring seal in the peripheral groove forming a closure for the vent passage but enabling outflow of pressure which may leak into the central chamber of the housing but preventing inflow of air and preventing entrainment of particulate into the interior of the housing.

2. The structure as defined in claim 1 wherein the end of the housing having the inlet port therein is externally threaded for screw threadedly mounting the housing directly on a master cylinder by engagement with an internally threaded port on the master cylinder.

3. The structure as defined in claim 1 wherein said piston includes a peripheral flange engageable with the shoulder between the chamber adjacent the outlet port and the central chamber to limit movement of the piston toward the outlet port, said calibrated spring means being disposed between the flange on the piston and the insert adjacent the opening which guides the piston with the piston, spring means, insert and valve member all being insertable and assembled in the housing from the inlet end thereof.

4. The structure as defined in claim 3 wherein said piston includes a seal peripherally thereof engaged with the interior periphery of the chamber adjacent the outlet port, the portion of the piston extending through and guided by the insert including seal means between the piston and the insert.

5. The structure as defined in claim 4 wherein said insert is retained in the chamber adjacent the inlet port by a retaining ring engaging the housing and the end of the insert adjacent the end of the housing having the inlet port therein.

6. The structure as defined in claim 5 wherein said valve member includes a poppet positioned interiorly of the insert and retained in adjacent spaced relation to the end of the passageway in the piston when the piston is positioned axially toward the outlet port by a spring with the valve member closing the passageway through the piston when the piston moves towards the poppet in response to fluid pressure engaging differential piston areas and producing a resultant force overcoming the calibrated spring means.

7. The structure as defined in claim 1 wherein the arrangement of the chambers in the housing, the piston associated therewith and the insert associated with the housing and piston enable increased expansion volume resulting from a longer piston stroke thereby providing an increased pressure drop downstream of the valve when pressure is released upstream of the valve.

* * * * *